US011717722B2

(12) United States Patent
Azaria et al.

(10) Patent No.: US 11,717,722 B2
(45) Date of Patent: Aug. 8, 2023

(54) COLLABORATIVE EXERCISE

(71) Applicant: Tonal Systems, Inc., San Francisco, CA (US)

(72) Inventors: David Azaria, San Francisco, CA (US); Sumner Browning Paine, San Francisco, CA (US); Justin Ziccardi, San Francisco, CA (US); Sarah Wilson Lewis, San Francisco, CA (US)

(73) Assignee: Tonal Systems, Inc., San Francisco, CA (US)

( * ) Notice: Subject to any disclaimer, the term of this patent is extended or adjusted under 35 U.S.C. 154(b) by 124 days.

(21) Appl. No.: 17/482,317

(22) Filed: Sep. 22, 2021

(65) Prior Publication Data

US 2022/0118316 A1 Apr. 21, 2022

Related U.S. Application Data

(63) Continuation of application No. 16/538,717, filed on Aug. 12, 2019, now Pat. No. 11,154,752.

(60) Provisional application No. 62/718,888, filed on Aug. 14, 2018.

(51) Int. Cl.
| A63B 24/00 | (2006.01) |
| A63B 21/005 | (2006.01) |
| A63B 71/06 | (2006.01) |
| H04L 65/403 | (2022.01) |

(52) U.S. Cl.
CPC ...... *A63B 24/0087* (2013.01); *A63B 21/0058* (2013.01); *A63B 24/0062* (2013.01); *A63B 71/0622* (2013.01); *H04L 65/403* (2013.01); *A63B 2024/0093* (2013.01); *A63B 2071/063* (2013.01); *A63B 2071/0655* (2013.01); *A63B 2220/30* (2013.01); *A63B 2220/40* (2013.01); *A63B 2220/52* (2013.01); *A63B 2220/56* (2013.01); *A63B 2220/62* (2013.01); *A63B 2225/20* (2013.01); *A63B 2225/52* (2013.01)

(58) Field of Classification Search
CPC ........... A63B 24/0087; A63B 24/0062; A63B 21/0058; A63B 71/0622; A63B 2071/0655; A63B 2024/0093; A63B 2225/20; A63B 2225/52; A63B 2220/30; A63B 2220/40; A63B 2220/62; A63B 2220/56; A63B 2220/52; A63B 2071/063; A63B 2024/0081; A63B 24/0059; A63B 24/0084; A63B 2225/107; A63B 21/285; A63B 21/4043; A63B 21/28; H04L 65/403

See application file for complete search history.

(56) References Cited

U.S. PATENT DOCUMENTS

| 4,627,617 A | 12/1986 | Gilmore |
| 5,318,491 A | 6/1994 | Houston |
| 6,450,922 B1 | 9/2002 | Henderson |
| 6,620,043 B1 | 9/2003 | Haseltine |
| 6,902,513 B1 | 6/2005 | McClure |
| 6,921,351 B1 | 7/2005 | Hickman |

(Continued)

FOREIGN PATENT DOCUMENTS

CN 203520652 4/2014

*Primary Examiner* — Andrew S Lo
(74) *Attorney, Agent, or Firm* — Van Pelt, Yi & James LLP

(57) ABSTRACT

A report of a state of a local exercise device based at least in part on a user response to an electromagnetic resistance unit in the local exercise device is sent. An update based on a state of a remote exercise device is received. The electromagnetic resistance unit is caused to change state in reaction to the received update.

20 Claims, 9 Drawing Sheets

(56) References Cited

U.S. PATENT DOCUMENTS

| | | |
|---|---|---|
| 8,517,899 B2 | 8/2013 | Zhou |
| 8,911,330 B2 | 12/2014 | Watterson |
| 10,022,590 B2 | 7/2018 | Foley |
| 10,322,315 B2 | 6/2019 | Foley |
| 10,471,297 B1 | 11/2019 | Smith |
| 10,864,406 B2 | 12/2020 | Foley |
| 11,170,886 B2 | 11/2021 | Foley |
| 2003/0134714 A1 | 7/2003 | Oishi |
| 2003/0171190 A1 | 9/2003 | Rice |
| 2009/0018795 A1 | 1/2009 | Priester |
| 2010/0125026 A1 | 5/2010 | Zavadsky |
| 2010/0148943 A1 | 6/2010 | Rosenberg |
| 2011/0251021 A1 | 10/2011 | Zavadsky |
| 2012/0108394 A1 | 5/2012 | Jones |
| 2013/0026322 A1 | 1/2013 | Wheeler |
| 2014/0038777 A1 | 2/2014 | Bird |
| 2014/0038781 A1 | 2/2014 | Paul |
| 2014/0194250 A1 | 7/2014 | Reich |
| 2015/0343290 A1 | 12/2015 | Freiberg |
| 2015/0360083 A1 | 12/2015 | Lagree |
| 2016/0067548 A1 | 3/2016 | Shiao |
| 2016/0074697 A1 | 3/2016 | Clarke |
| 2018/0021616 A1 | 1/2018 | Orady |
| 2018/0099178 A1 | 4/2018 | Schaefer |
| 2018/0111034 A1 | 4/2018 | Watterson |
| 2019/0099632 A1 | 4/2019 | Orady |
| 2019/0099637 A1 | 4/2019 | Valente |
| 2019/0351283 A1 | 11/2019 | Smith |
| 2020/0047027 A1 | 2/2020 | Ward |
| 2020/0047030 A1 | 2/2020 | Ward |
| 2020/0047053 A1 | 2/2020 | Ward |
| 2020/0047054 A1 | 2/2020 | Ward |
| 2020/0047055 A1 | 2/2020 | Ward |
| 2020/0054929 A1 | 2/2020 | Ward |
| 2020/0078635 A1 | 3/2020 | Smith |
| 2021/0111646 A1 | 4/2021 | Rubin |

```java
public static class MotorSampleEventBody implements MessageBody {
    /**
     * See the control mode list described above. This controlMode matches the actual state of
     * the system and NOT necessarily the requested state.
     */
    private int controlMode;
    /**
     * Measured tension by the motor in pounds force.
     */
    private float motorTensionLbs;
    /**
     * Weight requested from the motor, this will be (base + ecc + chains + spotted + ramp).
     * This does not adjust with inertia and friction calculations, ball stop weight, nor cart
     * unlocked weight.
     */
    private float totalWeightAppliedLbs;
    /**
     *  Base weight portion that would be applied at this time (ignoring ramping and spotting).
     *  This is usually the {@link MassProfileSet.MassProfileSetBody#baseWeightLbs} from the
     *  {@link MassProfileSet} except in racked mode when it is set to 5 lbs.
     */
    private float baseWeightAppliedLbs;
    /**
     * Eccentric weight portion that would be applied at this time (ignoring ramping and
     * spotting). This will change depending on phase. This will be 0 in racked mode.
     */
    private float eccWeightAppliedLbs;
    /**
     * Chains weight portion that would be applied at this time (ignoring ramping, and
     * spotting). This will change based on % of ROM. This will be 0 in racked mode.
     */
    private float chainsWeightAppliedLbs;
    /**
     * Total weight reduced at this time due to spotter acting on base, ecc, and chains
     * (ignoring ramping). This will be 0 in racked mode.
     */
    private float spottedWeightAppliedLbs;
    /**
     * Additional weight reduced (-) or added (+) to limit the rate of weight change, 0 means
     * we have reached the intended weight. This is used in both normal use and in racked mode
     * but with a different ramping curve.
     */
```

FIG. 5

```
    private float rampWeightAppliedLbs;
    /**
     * false is unracked (normal use), true is racked (base weight set to 5 lbs)
     */
    private boolean isRacked;
    /**
     * 0 is locked. 1 is unlocked. The position values change when the cart is unlocked
     * resulting in errant AWC values. The weight values reported are not modified during this
     * mode even though the actual weight is reduced.
     */
    private boolean isCartUnlocked;
    /**
     * Entire amount of cable spooled out in inches. This value tracks the motor position and
     * not the handle position.
     */
    private float positionMotorIn;
    /**
     * Speed of both cables in Inches per second
     */
    private float SpeedMotorIps;
     * Position of the left cable in inches. This value holds the cable distance from the last
     * time it was re-zero'd. This value can go negative or positive. Re-zero'ing events
     * occur if the motor position goes negative, the column cart pin is pulled, or after a
     * minute of inactivity.
     */
    private float positionCableLeftIn;
    /**
     * Speed of the left cable in IPS. Currently not supported.
     */
    private float speedCableLeftIps;
    /**
     * Position of the right cable in inches.  This value holds the cable distance from the last
     * time it was re-zero'd. This value can go negative or positive. Re-zero'ing events
     * occur if the motor position goes negative, the column cart pin is pulled, or after a
     * minute of inactivity.
     */
    private float positionCableRightIn;
    /**
     * Speed of the right cable in IPS. Currently not supported.
     */
    private float speedCableRightIps;
}
```

FIG. 5 (Cont.)

COLLABORATIVE EXERCISE

CROSS REFERENCE TO OTHER APPLICATIONS

This application is a continuation of U.S. patent application Ser. No. 16/538,717 entitled COLLABORATIVE EXERCISE filed Aug. 12, 2019, which claims priority to U.S. Provisional Patent Application No. 62/718,888 entitled COLLABORATIVE EXERCISE filed Aug. 14, 2018, both of which are incorporated herein by reference for all purposes.

BACKGROUND OF THE INVENTION

Exercise machines are typically single user appliances. Although the level of sophistication varies across a wide range of machines, these are typically designed to allow one user to exercise with the aim of building strength or endurance.

BRIEF DESCRIPTION OF THE DRAWINGS

Various embodiments of the invention are disclosed in the following detailed description and the accompanying drawings.

FIG. 5 is an illustration of an embodiment of a data structure containing items of data related to the operation of the motor of an exercise machine.

DETAILED DESCRIPTION

Figure 1:
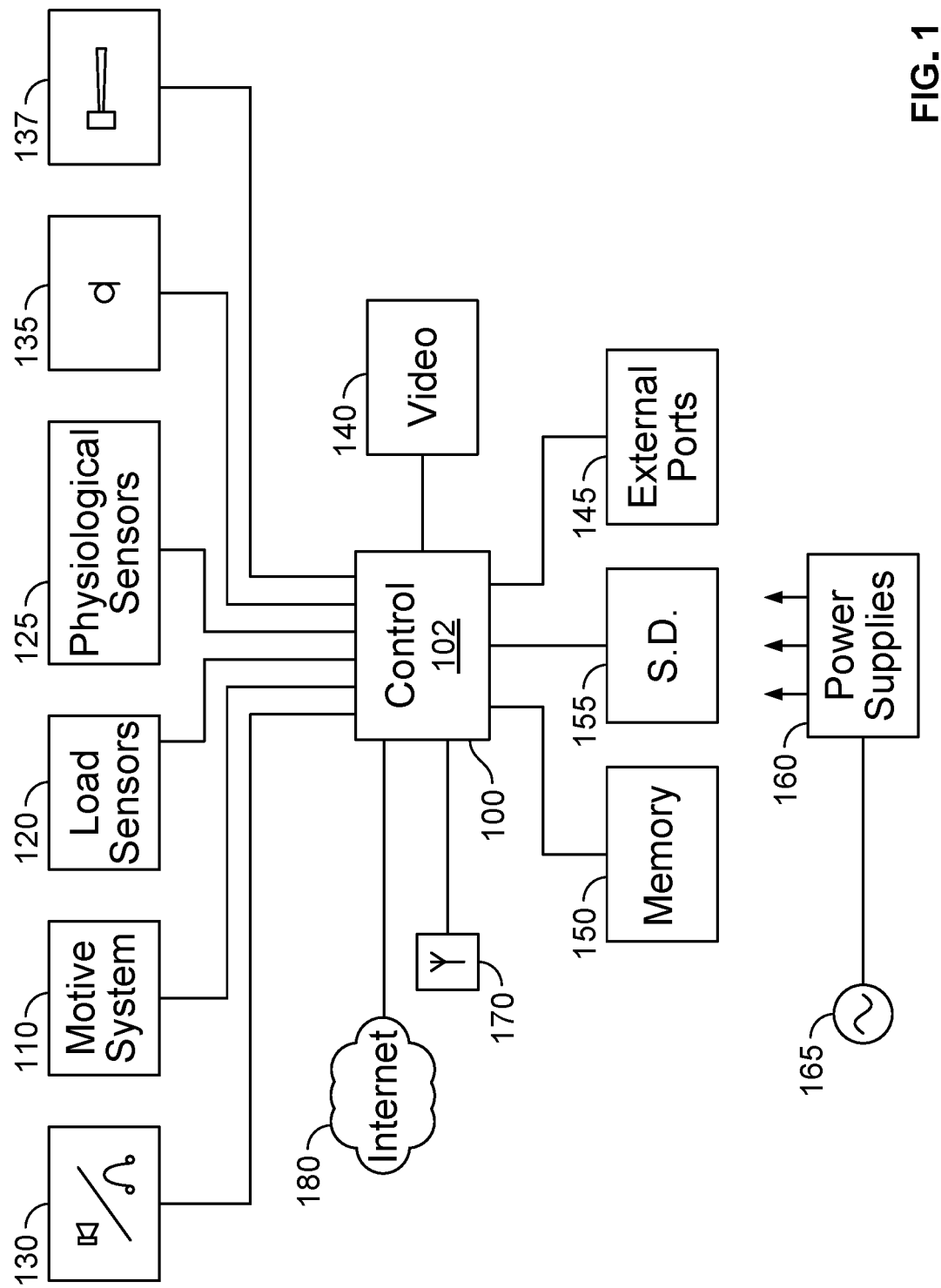
FIG. 1 is a block diagram illustrating an embodiment of a system for a collaborative exercise machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Collaborative exercise using a plurality of exercise machines is disclosed. Traditionally, multi-user exercise machines are rare and are typically comprised of several similar machines located so as to allow users to share a physical environment. For example, rowing machines are simply replicas of a particular boat, such as a pair, a four or an eight, with exercise positions positioned and articulated in the same way as in the actual boat. This allows users to experience and practice the coordination needed for synchronized operation as a team. The loads for each station are typically set using friction devices to simulate the working pressures experienced in a boat, without interaction between stations, except to possibly report position. A loss of synchronization between users usually results in a collision between users in the same way as a real boating mishap.

Traditionally, there are examples of specialized simulators across a range of activities but these are almost highly customized, costly and located at a specific location such as a professional simulation center. Such equipment is available only to a select group of users and not at all widely available.

Traditional shared environment simulators that allow a user to perform a task using similar visual and acoustic cues are single user machines that operate independently of other users. For example, cycling machines comprised of a simple pedal-driven dynamometer and the seating arrangement for a typical bicycle that display scenery on a programmed ride simply program a loading schedule that reflects terrain. Interaction between riders is not provided so the experience of draughting, or riding in close trailing proximity to reduce aerodynamic drag, is not possible. Such appliances are collaborative only to the extent that the task set is the same and regardless of the number of participants; a solo ride is no different from a team ride in terms of the effort required.

It is an improvement to take a widely available appliance and enable it to be used collaboratively in a way that mimics a shared environment as normally experienced in a team sport.

In one embodiment, an exercise machine passes the load or resistance, against which the user exercises, via a line or cable to an actuator, such as a grip, grips, lever or mechanism, that a user displaces in order to exercise. For example, in U.S. patent application Ser. No. 15/655,682 entitled DIGITAL STRENGTH TRAINING filed Jul. 20, 2017, which is incorporated herein by reference for all purposes, a "Digital Strength Trainer" is described. The digital strength trainer is an example of the exercise machine. The user displaceable part may be positioned relative to the user using, for example, one or more positioning arms and the load path is steered using pulleys at the positioning arm or arms. An arm or load steering mechanism is coupled to the exercise machine frame, which frame is firmly attached to a rigid structure. This may be by attaching the frame to a gantry, wall or floor or other substantial structure. In use, a load arm or load steering mechanism is positioned so that the user may access the loading mechanism according to the requirements of the intended exercise. In one embodiment, this position is one of several positions chosen to match the exercise configuration.

In one embodiment, the exercise machine is a digital strength trainer modified to allow for rowing and/or cycling, by using a rowing bench and/or stationary cycle and positioning the load steering mechanism such that the actuators are coupled to a rowing handle and/or stationary cycle pedal set.

In one embodiment, the exercise machine provides for data connectivity wherein the exercise machine may exchange information related to its programming and the exercise or exercises that are currently active. Because the parameters of the exercise machine may be varied in close to real time, one or more exercise machines having similar capabilities may supply information that may be used to alter the exercise machine's parameters and cause that exercise machine to alter its behavior, responsive to that of the one or more other exercise machines.

By way of example, consider the case where a pair of opponents are participating in a tug-of-war contest; pulling on opposite ends of a rope to try to overpower the other person. When one of the opponents pulls at the point at which a load is applied on a first machine, that load is measured and provided to a second machine which applies a demand to its loading mechanism so that the second opponent feels the same load as if the both opponents were connected by a rope, as in the actual physical game. The machine, being active, can create a pull force with ease and it should be evident that with judicious use of lever mechanisms, it is practical to convert this into a pushing force for different types of exercise.

Because it is sometimes that case that two opponents may be ill matched in physical strength, the loading ratio of each machine may be altered so that each opponent perceives an opponent of similar strength capabilities, for example a handicap system. A similar system may be used for a collaborative application where more than one user, operating from separate machines, act in concert so that their efforts are summed. So, for example, using a cycling metaphor two participants may cooperate as if they were riding a tandem wherein both "riders" contribute some of the effort and if one rider relaxes, then the other rider is required to supplement the missing effort or else suffer the effects of reduced power.

In an exercise application which is based upon a cooperative effort, whether in concert or as opponents, such a collaboration application is a significant advance in modifying the exercise dynamics, responsive to the efforts of fellow participants.

Enabling cooperative exercise activities wherein the efforts of a participant have a direct effect on the effort demanded of others is disclosed. In one embodiment, these effects are related in intensity as well as in time so that the application of effort may be reasonably synchronized between cooperating participants.

FIG. 1 is a block diagram illustrating an embodiment of a system for a collaborative exercise machine. In general, a collaborative system is comprised of at least two such exercise machines or devices. In one embodiment, one of the plurality of exercise machines may be a virtual exercise machine that represents a virtual opponent or cooperative contributor, wherein performance parameters may be pre-determined and intended for solo practice.

The exercise machine (100) is comprised of multiple systems and as such requires the use of a controller to coordinate operation of the various parts. For clarity and without limitation, controller (102) is depicted in FIG. 1 to be a single device with any required signal conditioning or power management implemented in the best location for efficiency and performance; systems like this may alternately be distributed and comprised of elements that are linked so that information may be passed between them as required.

For example, sensors that are used for physiological monitoring (125) are often low level devices, so any pre-amplification or signal conditioning might be best collocated with the sensor itself. The controller (102) may be implemented in distributed form and, for the elements of the exercise machine that have stored energy, emergency handling systems preferably are local functions to alleviate risk of injury due to failure of critical parts or interconnection systems.

Fault detection may be achieved in various ways. Safety considerations mean unexpected or potentially dangerous operations may be detected and remedied. Sudden load application during movement in the course of an exercise may be unpleasant and in some users may cause sprains and strains. Some load relief mechanism may be provided to limit this risk.

In one embodiment, a magnetic clutch not shown in FIG. 1 is provided that decouples the resistance unit (110) from the actuator such as the grips, stirrups or arms and levers that are normally used. The controller (102) may detect the unexpected operation by comparing the demanded operation with the actual operation of the resistance unit (110). The tolerable difference between demand and result may be pre-determined and may invoke a shutdown program when this difference is exceeded that includes depowering the resistance unit (110) and braking the resistance unit.

In an electrical and/or electromagnetic exercise machine, one or more current limiting settings may be used to perform this function. In a hydraulic resistance unit, flow-limiting orifices may be used to perform the function. Snap loads may be limited using magnetic couplings between the actuating cables and the resistance unit (110). Load absorption may be performed using spring connections or biases applied to pulley combinations.

The controller (102) may keep a log of all detected error conditions and report these when queried either locally or remotely. Although automatic reset for incidental faults may normally be made available to a user, preferably the user cues the reset in response to information provided by the controller (102). Hardware limiters may be used to overcome catastrophic failure of the resistance unit drive and prevent movement until the fault is rectified.

Some elements that are required for safe operation are not shown in FIG. 1 and are simply assumed to exist, for example a router and firewall function that allows the controller (102) to be linked via a control/network interface (170) to an internet service (180). Alternately from an "internet services" element (180), a local area network without external connection may be applicable when the exercise machine or a group of exercise machines are cooperatively enabled in a fixed setting such as a dedicated training facility; in this case a server could also be co-located. In a distributed use application, where the exercise machine is connected to a server that enables cooperation, it may not be possible to guarantee that the exercise machine is secure from all forms of attack and so certain parameters may be preset that define limiting conditions for the exercise machine, for example no matter the level of authentication the exercise machine may not exhibit more than a preset safety load for a given collaborative exercise movement, for example fifty pounds for a tug of war movement. Detection, containment and recovery from faults may be provided for in a traditional manner.

Power is provided for the exercise machine using a power supply (160), that may be connected to power sources (165). Power may be drawn from battery systems and/or domestic power line sources. In one embodiment, the exercise machine includes a battery element that provides for a short period of operation following the loss of primary power. This is helpful in guaranteeing that a loss of primary power may be followed by a graceful, controlled shut down.

The ability of the exercise machine to offer access to a shared environment which is provided to the user as a visual, acoustic, and/or haptic information set includes that this may be defined as a media centered system and the same terminology is used to describe its controller (102). The controller (102) comprises one or more processors coupled to interface circuits and includes many of the elements of a typical computer system. The user works against loads or resistance generated by the machine. In one embodiment, these loads are determined by a collaborative scenario based on the efforts exerted by collaborators in addition to shared environmental conditions applicable to the task. For example in the case of a rowing exercise with three other participants, simulating a "rowing four," additional environmental factors might be the current in the water as well as the prevailing wind.

Exercise loads are generated for the user by working against a motive power system (110) which may be one or more electric motors or other resistance unit types; for example, hydraulic resistance may be used wherein the pressure and/or flow is controlled, or a screw resistance unit may be used where the rotation of the screw is powered either electrically or hydraulically.

In one embodiment, a permanent magnet brushless electric motor (110) having a high pole count and capable of producing high torque is used. A particular benefit to using a high pole count motor is that the torque may be held relatively constant as the rotor steps from pole to pole so that there is no sense of pulsing transmitted to the user. Motion and torque or load may be coupled to a cable system that the user displaces or loads, using a simple drum system that winds the cable in or out, a pulley system that alters the available length of the cable or an equivalent power transmission system. Depending upon the degree of customization required, other mechanical components such as levers or bellcranks may also be used to adapt the loading mechanism to the activity being simulated.

To monitor the operation of the exercise machine in use, load sensors (120) are connected to the controller. These sensors may include direct or indirect force sensors to measure cable tension that is proportional to the load applied as well as movement sensors that measure displacement of the cables and components. The controller may store this load and displacement data including a time reference as part of its user tracking function. In one embodiment, the cable tension is determined by the force applied to a pulley or pulley assembly that displaces the cable slightly.

As tension is increased, the cable attempts to straighten, which force is measured by the strain on this pulley or pulley assembly and this strain is converted to a measure of the tension applied. If the pulley is flexibly mounted, then the displacement of the pulley may be used as a measure of cable tension. The cable movement or displacement may be measured directly, using an encoder coupled to the cable.

In one embodiment, the angular displacement of a component to which the cable is tethered is measured and cable displacement calculated or derived. By keeping a record of the cable tension and its displacement, exercise performance and any irregularities may be inferred. In one embodiment, this harvested information is used to modify the exercise parameters to set a performance level and to control irregularities. In one embodiment, cable tension, and thus load, is derived from the amount of electrical current being consumed by the motor since this is representative of torque and thus the load.

Physiological sensors (125) may also provide information to the controller (102). These may include elements such as heart rate, oxygen perfusion information such as SpO2 and respiration rate. These sensors (125) may be worn directly by the user and the data passed by wire and/or wirelessly to the controller (102). In one embodiment, the sensors (125) are attached by an umbilical wire to a wrist or chest band that the user dons before starting to exercise. In one embodiment, a wireless coupling system is used to pass the information and the user wearable apparatus, such as a fitness watch or similar, may be provided with a storage location that allows it to be recharged. In one embodiment, respiratory information including the expired gas content is passed to the controller. The controller (102) may detect sensor (125) problems and may offer the user assistance in remedying matters using the audio/display capabilities (130, 140).

Acoustic information may be provided by the controller using audio transducers (130) such as one or more loudspeakers or headphones. The use of wireless links may use traditional techniques and supplementary audio equipment may be added as needed. One or more microphones (135) may be provided to allow the controller (102) to monitor the user's acoustic environment and this in part permits the controller (102) to compensate for varying noise levels.

In one embodiment, the audio content of an exercise session is embedded with an identifying code that enables the controller to detect this identifying information using the microphone (135) and the controller (102) may use this identification data to reduce the risk of unauthorized content affecting the exercise machine and/or user. The embedded code may be recovered and decoded by the controller (102) and compared with a white list of permitted content. This content monitoring and its results may be shared with a connected server so that unauthorized or intrusive content may be detected and remedied.

A camera (137) may be used to capture performance information such as posture of the user. Visual content, either stored or streamed live, may be displayed on a display screen (140) that may be built into the exercise machine frame or positioned for user convenience. For collaborative sessions, this visual information may be key for the user to accurately time the application of collaborative effort. The video information is often coupled or synchronized with the audio content, such as the breathing cadence of other participants, so that a seamless representation of a human collaborator may be presented to the user.

In one embodiment, during operation a user may enable a screen (140) that presents a number of options, amongst which may be exercise tasks that require additional, collaborative participants. Selecting one of these tasks signals a server platform that collaborators are required and the user may be offered a choice to engage with a simulated collaborator or one or more live collaborators may be requested. The ability to practice particular aspects of a task using a simulation of a collaborator is a valuable practice feature that allows a user to build reactions or "muscle memory" for certain tasks and it is effective to use a machine for this since the task rates may be started at a lower rate and built towards a full speed engagement without the burden of impatience on the part of a human participant. The simulated collaborator may, for example, be implemented by mirroring the requesting user's performance based on that user's performance history and demanding extra effort in the weaker areas whilst spending less time in areas that a user has mastered. Here the goal may not be an absolute performance standard, but a percentage improvement at the user's level.

In one embodiment, if a live session is requested using screen (140), then the server platform offers a scheduling utility that allows invites to be issued for a particular time. In one embodiment, the invite system is broadcast to qualified collaborators, based on the user's working record. A graduated system allows beginners to participate at a level that is achievable but does not burden a skilled collaborator with a neophyte. However, if an invite to participate is sent to specific users, the user who sets up the collaboration may determine if a user is qualified by issuing the invite.

In one embodiment, a virtual collaborator for solo practice may have minimal coaching input without adverse effect but since it mirrors closely the development of a workout for an individual, an entire ab initio training sequence may easily be implemented. In general, it may be preferred if the virtual collaborator is selected from a collection of progressively more capable counterparts and this may be delivered automatically as user proficiency improves.

In one embodiment, the normal use of the exercise machine may be based upon tasks that are set by a coach or trainer and are mostly performed solo; that is to say that the effort demanded of the exercising user is only affected by the user's reaction to the selected program. Any visual and acoustic representations of the environment may be more in the nature of corroborative detail and mimic the experience of a shared training environment such as a gymnasium; acoustic background, for example may contain the echo quality and noises experienced in an open hall such as expulsion of breath on moving a substantial load. In one embodiment, the microphone input (135) is acoustically shaped to mimic speech and sound such as the squeak of shoes in an open gym or other locale.

In a simple collaborative setting, users may compete or collaborate based on time to finish the number of repetitions, work completed and consistency. In this case it moves beyond the generic environment to a specific environment involving only those invited participants which might be similar to a smaller confined space or room rather than a large hall. Here, the visual and acoustic components of the experience may be those of the participants and may have the quality of a "live chat" session in addition to the supplementary information related to each or any participant's performance at an exercise routine.

Visual components may include movements characteristic of the activity being exercised, for example the rocking motion of a bicycle synchronized to the pedaling activity, simulated by horizon transitions and/or bank angle in the background visual elements. Acoustic components may include music the playback of which is synchronized for both the user and the virtual collaborator(s), simulating a shared environment.

In the same way that social media platforms have established common interest groups linked with members, often termed "friends", collaborative exercise machines extend this concept from simple exchanges such as chat to a fully enabled physical exercise encounter with most of the attributes of a gymnasium exercise engagement. From a group of "friends" a collaborative exercise machine makes it possible to generate ad hoc collaborative exercise sessions regardless of physical location and independent of third party exercise facilities. In particular, an improvement of this machine is that collaborative exercise is seen to significantly increase psychosocial and personal motivation, with a resultant increase in user performance, efficiency, and capability.

In one embodiment, peer feedback uses the exercise machine mounted camera to link a video element supplementing the chat session to the group so that the impact of the feedback is augmented; this may be done as an inset or foreground to the screen. In one embodiment, all participants are seen as thumbnails on the screen and the speaking-user image is enlarged whilst speaking.

In one embodiment, when one of the collaborating participants is acting as a coach or leader of the activity, then this user includes performance information in graphical form to supplement the feedback. For example if one of the participants is having difficulty with exercising synchronously, the supporting information that is part of the data set that this user's exercise machine may be drawn to the group or subset of the group's attention so that corrective action may be taken.

In one embodiment, when large groups are collaborating, there may be a problem with simultaneous speakers and interruption that disturbs the exercise routine, so a moderator function is provided that requires a user to request presentation rights prior to being given speaking rights. This moderator function may be adopted by any participant or it may be provided by a server platform and controlled algorithmically. In the case of an algorithm, a speaker may be assigned a priority so that an order of speaking can be calculated; a knowledgeable contributor may have a higher priority than casual observers so that this speaker would have preferred access to the user. For example a coach is selected to speak before a participant, but an advanced or selected user has a close priority to the coach so that a response could be provided that preempts another participant's input or comment.

Text exchange is also used and useful when a coach or trainer wishes to dispense directed advice to individual participants without sharing this across an entire group. A further benefit of text handling capability is that it allows for third party commentary from group members that are not currently participating directly in the exercise task.

The coach or trainer may be an independent provider that is engaged by different groups as required. In one embodiment, the coach is akin to a personal trainer who directs just the specific group of participants. In one embodiment, the coach is one who runs a large live class, comprising multiple exercise groups and individual participants. The members of each such group interact amongst themselves as described herein, but different groups may not interact between each other. The coach, however, may be afforded insight into all of the groups and individuals participating in the live group class.

In one embodiment, the coach or trainer does not have to be directly engaged in the physical aspect of the exercise in the way that a participant would normally be involved, but may participate using a terminal which is able to interface with the server. In one embodiment, the coaching terminal is a software application that runs on a personal computing device such as a laptop or tablet. This application may be enabled using session keys to access particular group events. In one embodiment, the coaching terminal is a thin client that runs on a personal computing device and the primary application runs at a server. It should be clear that an approval mechanism may be imposed on coaches or trainers to protect participant data. One feature is that coaches or trainers may be registered with a specific set of credentials that would allow them to advertise their coaching services.

In addition to a coach participating in the group exercise session via a mobile app or website, some participants in the group may also participate in the session via mobile app or website. This participation would still be fun, but limited to the capabilities of the mobile or computing device. For example, such devices are likely to have screens and microphones, enabling these participants to participate in the fun visual and auditory experience of the group exercise session. But such devices typically have no motor driven exercise functionality similar to a collaborative exercise machine. Accordingly, the load or resistance experienced by these participants may not be driven by nor shared amongst the group.

Figure 2:
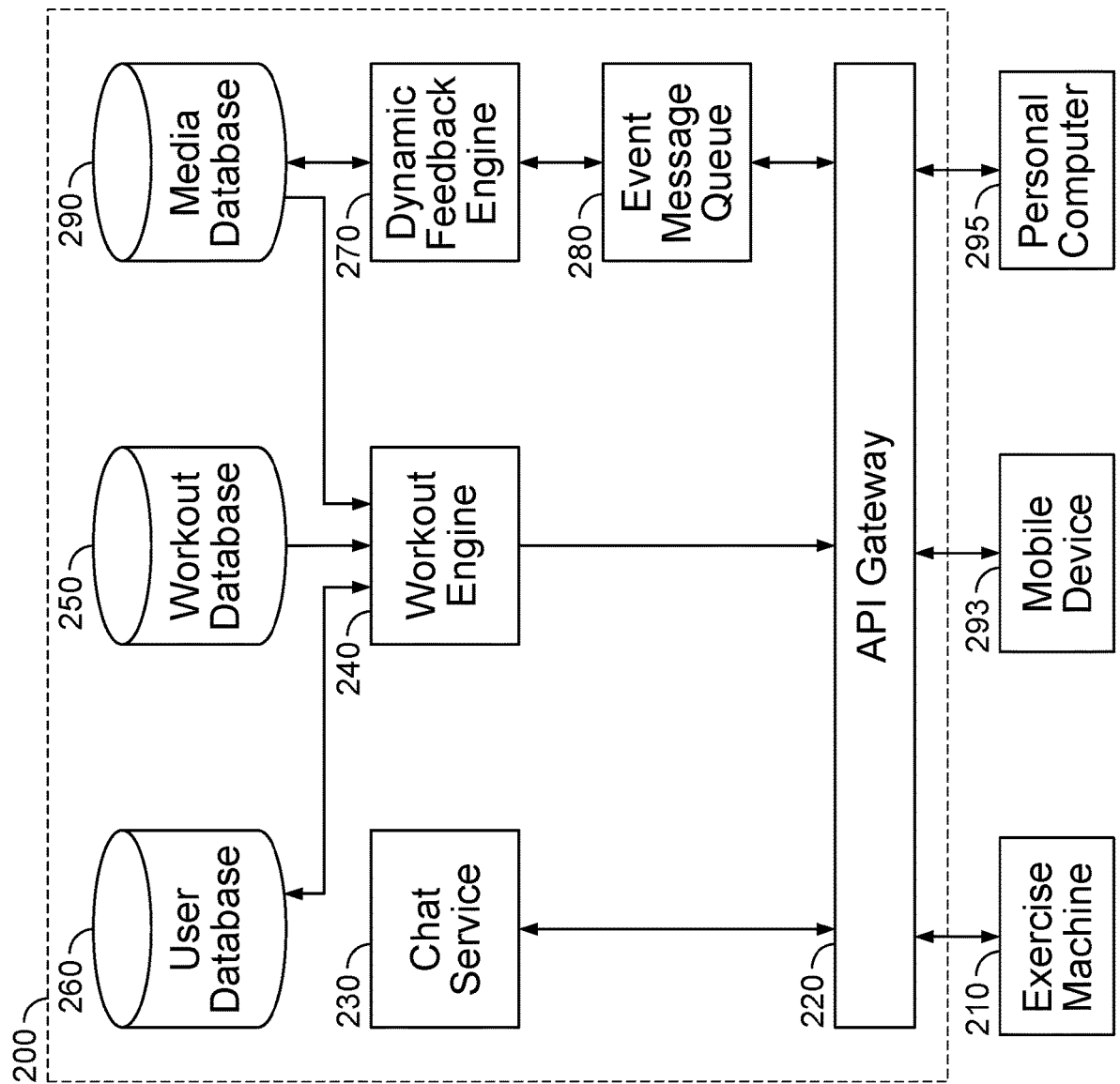
FIG. 2 is a block diagram illustrating an embodiment of a system for a collaborative exercise platform/server.

FIG. 2 is a block diagram illustrating an embodiment of a system for a collaborative exercise platform/server. Collaborative exercise machines such as those in FIG. 1 may use a coordinating service in order to function in the collaborative mode since synchronicity improves shared or collaborative endeavors. For example, a team rowing together maintain a stroke count accurately and over long periods of time. If one member mis-strokes or fails to release the oar from the water at the same time as the others of the team, then the resulting loss in performance may lose the race. The functional elements of the server (200) are shown as high level functions without limitation, as physical databases (260), (250) and (290) may be shared with other servers and further may be mirrored in various locations so as to provide redundancy in order to guard against failure or malicious action.

A workout engine (240) provides information to exercise appliances that are connected to the server. User data, workout data and media data are combined by the workout engine to create one or more files that are sent to connected exercise appliances that defines their function for that exercise session.

In one embodiment, the workout engine (240) provides timing information to enable synchronous operation. Because each appliance is able to maintain a real time clock with update timing available from either the network or from a satellite reference, the workout engine (240) may generate this timing data as ∂-time referenced to a master clock. In this way, fairly long network latencies may be tolerated without loss of performance. Time information may be exchanged frequently enough to allow near millisecond accuracy which is more than sufficient for this purpose of collaborative exercise.

In one embodiment, a workout database (250) stores the information that describes the workouts that the exercise appliance is able to provide. The range of workouts continually increases as more information is provided from exercise appliances in use, which appliances may deliver data for each exercise session. Accordingly, this database (250) may be scalable.

In one embodiment, a user database (260) stores each user's history and this data may be used by the workout engine (240) to modify workout data retrieved from the workout database (250). Algorithms run by the workout engine (240) are designed to optimize various exercise parameters based on the user's objectives as supplied to the server and the history of that user's performance. In addition to information that controls appliance function, there are additional components that support the delivery of instruction and motivational cues. These supplementary elements may comprise acoustic and visual information that causes the user to experience personalized tuition and are stored in a media database (290). Information such as predetermined messages may also be stored in this database (290).

In one embodiment, a chat service (230) provides for communication between participants. This chat information is exchanged with connected appliances through an applications programming interface gateway (220) that allows the connection of exercise appliances (210) as well as other components such as remote computers (295) and mobile devices such as tablets and phones via a mobility portal (293). The API gateway (220) also serves to authenticate connected devices and appliances.

In one embodiment, specific feedback to specific users is managed separately using a dynamic feedback engine (270). This differs from the chat service (230) in that it is not a broadcast to all participants but is a directed, defined access channel that allows information selection from the media database so that, for example, a tempo increase instruction to the user is coupled with media information that qualifies the instruction.

In one embodiment, information is exchanged using the API gateway (220) and is queued in both incoming and outgoing directions by an event message queuing (280) routine. This ensures that events are carefully timed and not handled arbitrarily so that the user does not experience scrambled message delivery as a result of parallel attempts from more than a single access point to offer feedback.

In one embodiment, the dynamic feedback engine (270) also receives incoming video and audio information as required and after parsing passes some or all of this information for storage in the media database (290) for later retrieval. The workout engine (240) is also able to access the media database (290) and may deliver some of this feedback incorporated into its communications with the exercise machine (210).

In one embodiment, the task of routing communications to either the chat service (230) or the feedback engine (270) may be managed by the API gateway (220). In one embodiment, responsive to feedback commentary, the feedback engine (270) determines that feedback represents a technique suggestion and checks to see if instruction to remedy that deficiency exists in the media database (290) and if it does, pushes a request to the media database (290) to submit that remedial instruction clip to the workout engine (240) for delivery to the user's exercise appliance (210).

Figure 3:
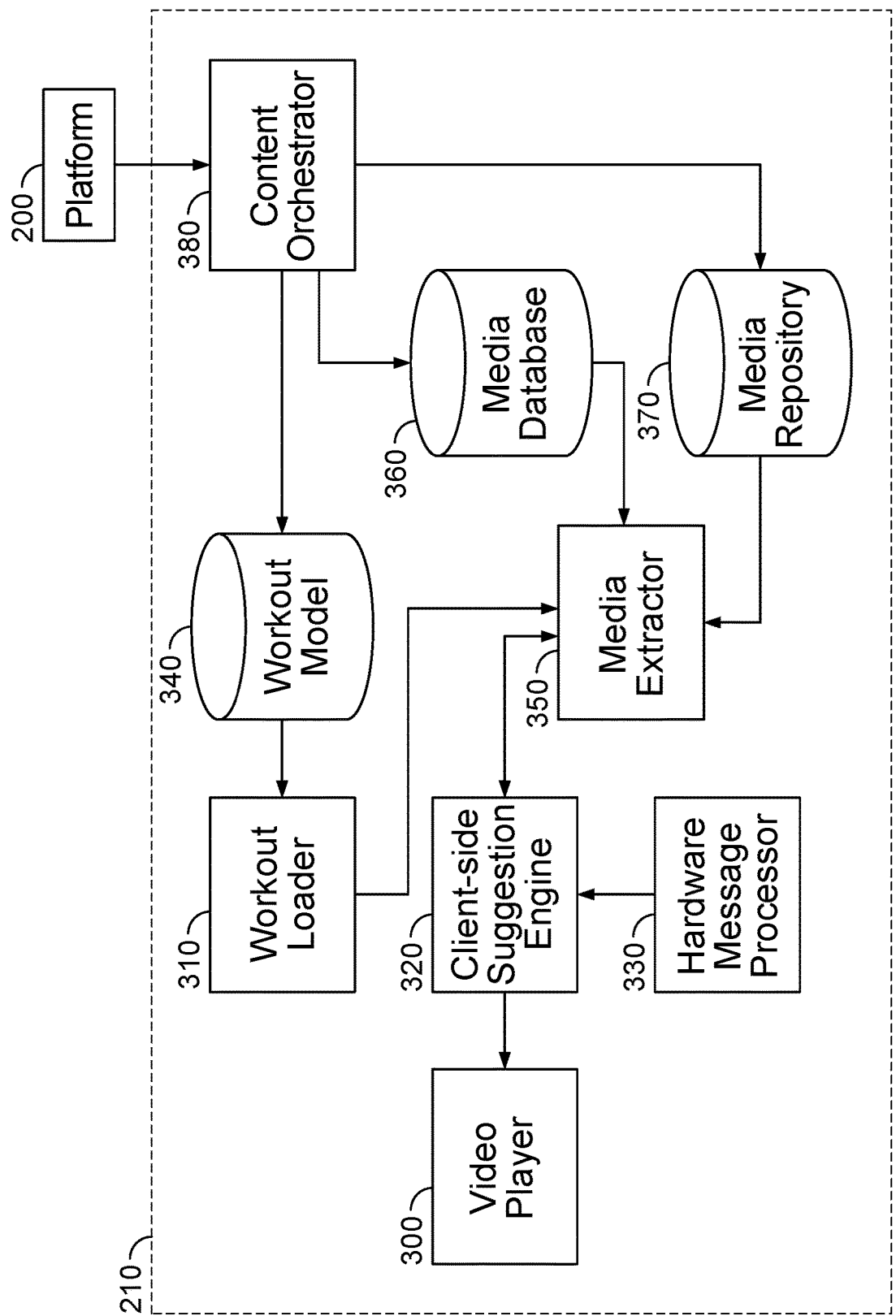
FIG. 3 is a block diagram illustrating an embodiment of a system for a collaborative exercise machine in terms of functional blocks.

FIG. 3 is a block diagram illustrating an embodiment of a system for a collaborative exercise machine in terms of functional blocks. In one embodiment, the machine of FIG. 3 is a functional block diagram of the machine shown as a representative diagram in FIG. 1.

In one embodiment, information is exchanged between the collaborative exercise appliance (210) and the server platform (200) including program data, coaching or training information as well as user performance information. Information arriving at the appliance is parsed by a content orchestrator (380) and delivered to the relevant recipient.

In one embodiment, the essential data concerning the operation of the appliance as an exercise machine is delivered to a workout engine that is defined by the workout model (340) that stores this data, which information is generally parametric in nature. That is, the hardware structure of the machine is predetermined and the information that drives the hardware is comprised of voltage, current and time information; load factors of course imply a particular current and voltage relationship that may exist at the resistance unit that generates the load.

From time to time, the workout model may change and in this case the information may be a new model program that is then supplemented by matching parametric data. In one embodiment, workout model programs are retained and are invoked as required depending on the workout selected; in another, new workout model programs replace the old programs and may modify stored parameters so as to be compatible with the new model.

In one embodiment, a workout loader (310) invokes a workout model and its associated parameters for a particular workout. Part of the parameter set for a particular workout identifies a number of media components, both visual and acoustic, and the workout loader retrieves and loads these components from the media database (360), via intermediating elements to the media player (300) which synchronizes the presentation of this information to correspond to the exercising user's efforts. The media extractor (350) compiles media clips, based on the information received from the workout loader (310), into a file that can be used by the media player (300).

In one embodiment, a further intermediator called a client side suggestion engine (320) may alter the timing of the compilation received from the media extractor (350) to allow for tempo changes in the exercise rate and is also responsive to supplementary messages received from a message processor (330). This message processor (330) is responsive to a variety of messages such as those received from an external coach or trainer wherein a particular exercise component may be required to be repeated and this would cause the suggestion engine (320) to request this action from the media extractor (350).

In one embodiment, information drawn from the media database (360) and compiled into a file, including changes to this file when requested by the suggestion engine (320) may be stored in a media repository (370) which comprises media information that is specific to a particular machine and one or more of its users. This information may be provided to the server platform (200) on request so that it may be used elsewhere as required. Although this activity consumes storage space, only the indexing information need be provided, with the benefit that known or frequent media combinations are quickly retrieved and analysis of exercise profiles then becomes more efficient.

In one embodiment, the exercise appliance (210) uses an electric motor having a high pole count which enables it to produce almost constant torque to supply the load against which the user exercises, wherein this load is referred to herein as a "digital weight". With knowledge of the spool and pulley system that couples this torque to the user, the tension in the coupling mechanism may be determined proportionally to the excitation currents or by direct measurement using load cells arranged as a tensiometer. It is therefore practical to assign any combination of digital weights in sequence for the user to experience and to operate against.

Although a cable system is preferred for a general purpose appliance, in one embodiment, a pushrod system is coupled to the force generator to allow a user to apply pushing forces/compression as well as pulling forces/tension to the appliance. In normal single user exercises, the load is preset according to an exercise loading schedule and responsive to the user's efforts. Loads may change to accommodate user performance and this loading information may be stored as part of a user's exercise record, or profile.

Consider a simple competitive effort between two users, such as a tug-of-war. Here, two opponents physically pulling in opposition to each other on a rope, whose center is designated with a flag as a marker, attempt to overpower one another. The determination of who is able to pull the flag or marker over a line establishes the winner. As simple an exercise as this is, two well matched opponents develop tactics that alter the timing of the application of pulling forces to set the antagonist at a disadvantage.

Figure 4A:
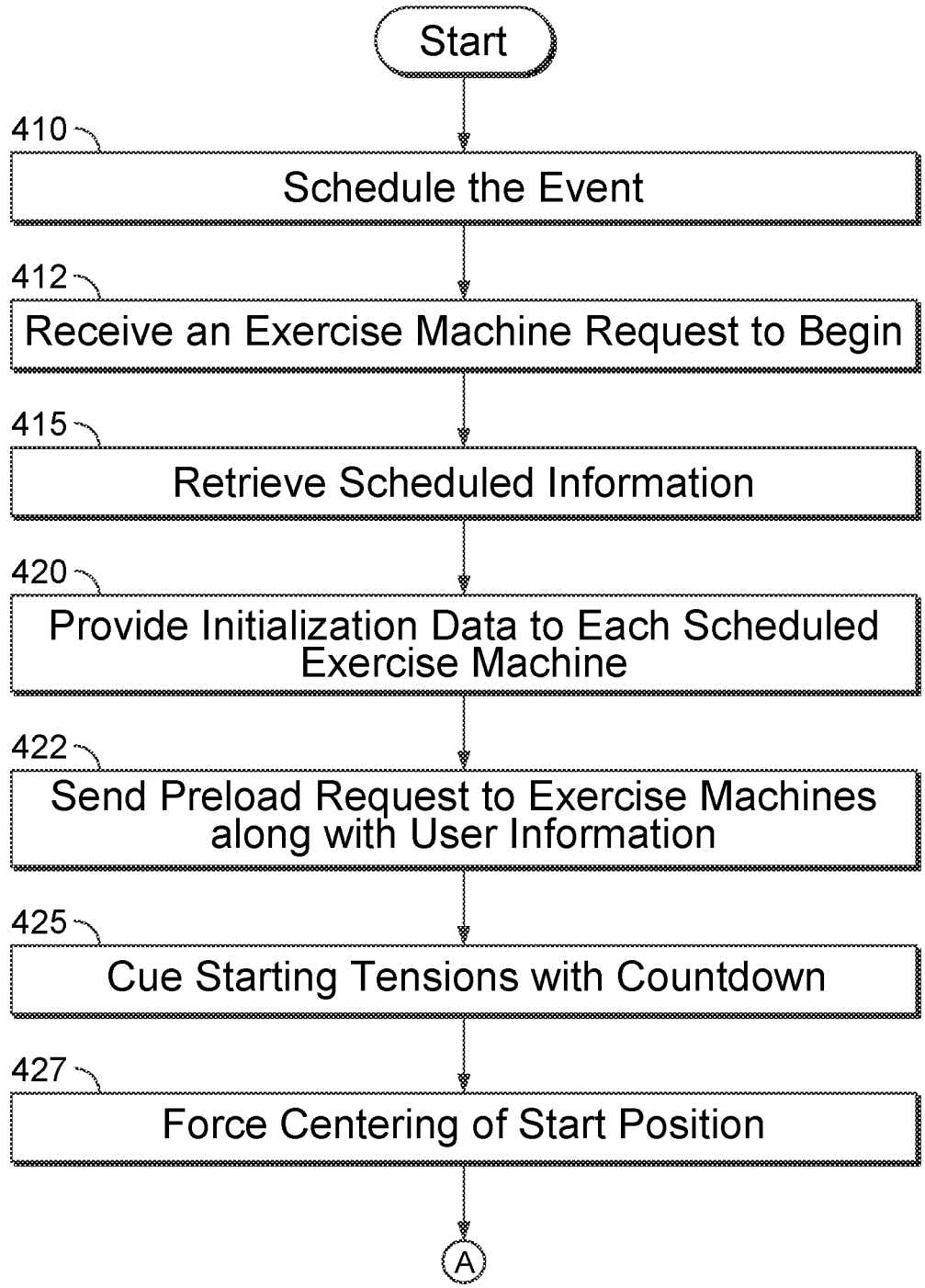
FIGS. 4A and 4B are a flow chart illustrating an embodiment of a process for collaborative exercise machines.
Figure 4B:
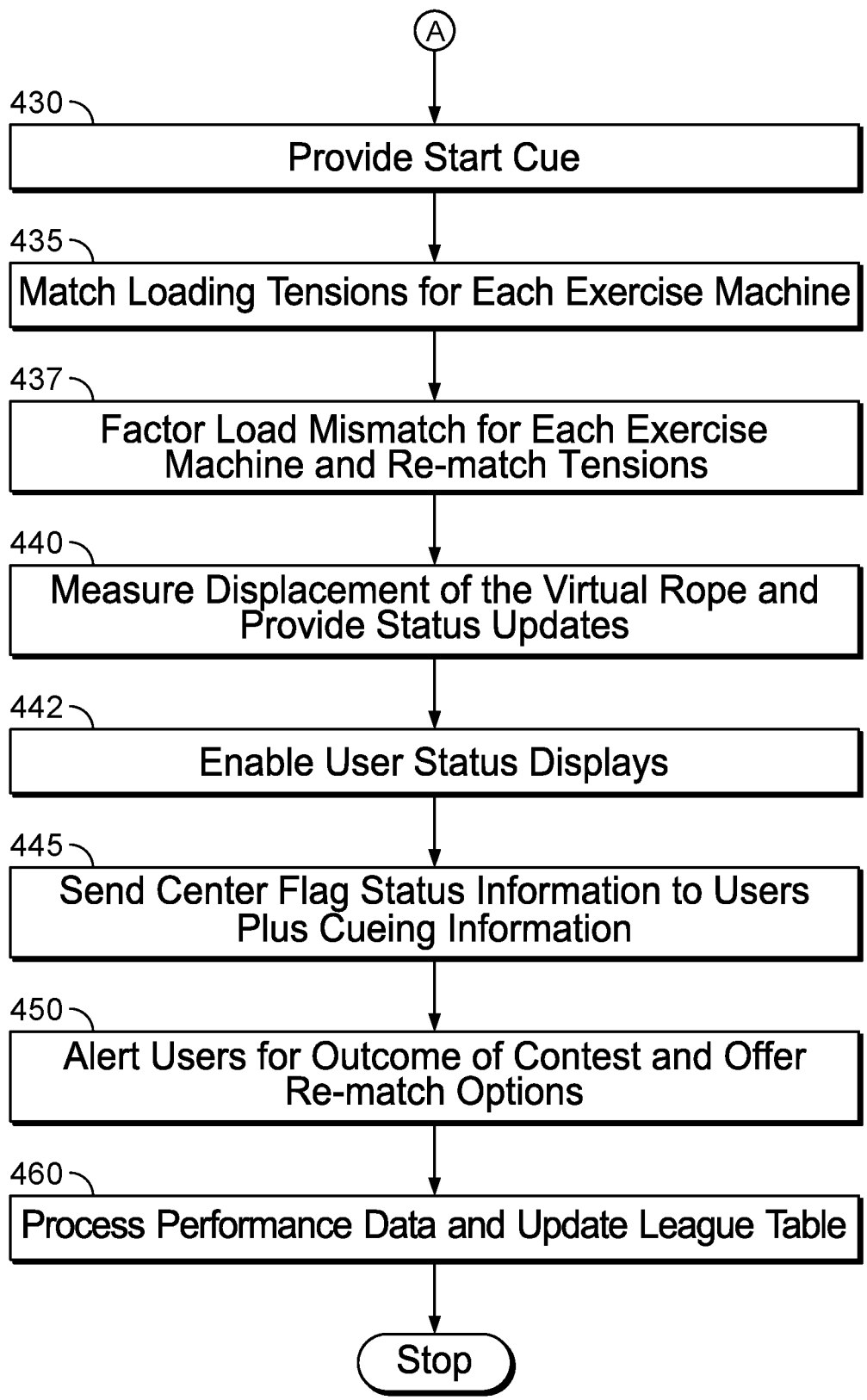

FIGS. 4A and 4B are a flow chart illustrating an embodiment of a process for collaborative exercise machines. In one embodiment, the process of FIGS. 4A and 4B is carried out by the systems in FIGS. 1, 2, and 3. Without limitation the example of a collaborative tug-of-war movement is described, which may be generalized to any collaborative exercise.

A precursor to competitive engagement is the creation in step (410) of a calendar entry that creates a retrievable record for each participant. Once the participants or competitors are positioned at their respective exercise machines, either exercise machine may issue a ready command to the intermediating server. The server may then recover the calendared session data in step (415) and request an affirmative readiness indication from the other exercise machine. The server may also send configuration data to each exercise machine in step (420) in preparation for competition, which data is used to program required parameters for each competitor. In one embodiment, each exercise machine establishes a websocket connection to server (200).

Once each exercise machine is ready, then the server may offer an instruction to begin to pull to a starting point in step (422); in one embodiment, this comprises a series of acoustic cues for the period used for applying a start load in step (425) followed by a countdown displayed for each user, accompanied by an acoustic cue to signal the countdown steps with a distinguishable cue to indicate a start or "go" command in step (430) for the participants.

Conventionally, each participant "takes the strain" which tensions the rope in a normal tug of war contest followed by a shouted "pull!" instruction from a judge, so in this case the exercise machine determines a start position in step (427) based on the displacement of the user grip. During this application of effort by the user, the exercise machine smoothly increases the load so that at the starting load in step (425) the position is held; this starting load is determined from user records showing an estimation of the user strength capability.

If a user attempts to over tension at the beginning of the contest, the exercise machine may simply increase the load so that no further displacement is possible; in one embodiment, the load is pulsed so that the user feels a jerking action to indicate that an over-enthusiastic effort has been applied and a suitable acoustic cue may also be offered. In the context of a very physical, high effort sport or activity, these cues may be remarks or comments that may be encouraging or insulting according to the user's behavior.

Once the countdown timer has expired and the users have commenced to pull competitively, the load applied to each user is one half the sum of the two users' effort in step (435). Either user is pulling or being pulled by the cable, and a user's exercise machine (210) records this fact. In one embodiment, a first exercise machine (210) sends this data, via the websocket, to workout engine (240) of server (200). Using this data, workout engine (240) calculates the updated resistance for second exercise machine (210). Workout engine (240) requests that second exercise machine (210) update the resistance/digital weight for a second user associated with second exercise machine (210). Note, this delta may be positive or negative depending on whether the first user and/or the first exercise machine (210) is pulling harder.

As this data is being received by workout engine (240) from both exercise machines (210) simultaneously, or nearly so, the load or resistance for each user can be calculated as one half the sum of the two users' effort. The first exercise machine (210) and second exercise machine (210) update their display (140) to show the current position of the rope relative to how far each user has pulled their cable.

In one embodiment the actual load experienced by a user is modified in step (437) by a handicapping function so that raw strength is greatly reduced as a factor in the contest. If a user fails to counter this load, then that user's grip may be pulled closer to the exercise machine, whereas the opponent's grip may be allowed to move away in step (440). Continued displacement in this way may eventually cause the underperforming user to lose the round.

In one embodiment, the visual display (140) may show a flag in step (445) that marks the nominal center of a rope moving relative to the starting line so that a user receives meaningful cues about the progress of the game. Once the flag is moved over a predetermined threshold, normally two disposed equidistant from the nominal center-point, then a winner is declared.

In one embodiment, the exercise machine of the winner, say, for example, second exercise machine (210), sends workout engine (240) a message via the websocket that the second user has won the contest. Workout engine (240) then sends the first exercise machine (210) a message via the websocket that the first user has lost the contest. Both exercise machines (210) then remove their resistance/digital weight so that the users can retract the cables. Workout engine (240) updates the records in the user database (260) for each user's score based on the match.

User performance may be reported in several ways in step (442); continuous reporting may be used where information comprised of load and movement measurements is passed to the server on a time interval basis. In one embodiment, user records are based on event occurrences such as a change in the loading or movement of the loading mechanism and the time information when this change happened.

Once the contest is concluded in step (450), an opportunity for a re-match may be presented to either or both participants. At the conclusion of an event, the server may then process the user information gathered in the course of the event and use this to calculate and rank in step (460) the user performance and then update a record such as a league table.

FIG. 5 is an illustration of an embodiment of a data structure containing items of data related to the operation of the motor of an exercise machine.

The data structure includes:

```
public static class MotorSampleEventBody implements MessageBody {
/**
 * See the control mode list described above. This controlMode matches the actual state of
 * the system and NOT necessarily the requested state.
 */
private int controlMode;
/**
 * Measured tension by the motor in pounds force.
 */
private float motorTensionLbs;
/**
 * Weight requested from the motor, this will be (base + ecc + chains + spotted + ramp).
 * This may adjust with inertia and friction calculations, ball stop weight, nor cart
 * unlocked weight.
 */
private float totalWeightAppliedLbs;
/**
 * Base weight portion that would be applied at this time (ignoring ramping and spotting).
 * This is usually the {@link MassProfileSet.MassProfileSetBody#baseWeightLbs} from the
 * {@link MassProfileSet} except in racked mode when it is set to 5 lbs.
 */
private float baseWeightAppliedLbs;
/**
 * Eccentric weight portion that would be applied at this time (ignoring ramping and
 * spotting). This may change depending on phase. This will be 0 in racked mode.
 */
private float eccWeightAppliedLbs;
/**
 * Chains weight portion that may be applied at this time (ignoring ramping, and
 * spotting). This will change based on % of ROM. This may be 0 in racked mode.
 */
private float chainsWeightAppliedLbs;
/**
 * Total weight reduced at this time due to spotter acting on base, ecc, and chains
 * (ignoring ramping). This may be 0 in racked mode.
 */
private float spottedWeightAppliedLbs;
/**
 * Additional weight reduced (-) or added ( + ) to limit the rate of weight change, 0 means
 * we have reached the intended weight. This is used in both normal use and in racked mode
 * but with a different ramping curve.
 */
private float rampWeightAppliedLbs;
/**
 * false is unracked (normal use), true is racked (base weight set to 5 lbs)
 */
private boolean isRacked;
```

-continued

```
/**
 * 0 is locked, 1 is unlocked. The position values change when the cart is unlocked
 * resulting in errant AWC values. The weight values reported may not be modified during this
 * mode even when the actual weight is reduced.
 */
private boolean isCartUnlocked;
/**
 * Entire amount of cable spooled out in inches. This value tracks the motor position and
 * not the handle position.
 */
private float positionMotorIn;
/**
 * Speed of both cables in Inches per second
 */
private float speedMotorIps;
/** Position of the left cable in inches. This value holds the cable distance from the last
 * time it was re-zero'd. This value may go negative or positive. Re-zero'ing events
 * occur if the motor position goes negative, the column cart pin is pulled, or after a
 * minute of inactivity.
 */
private float positionCableLeftIn;
/**
 * Speed of the left cable in IPS.
 */
private float speedCableLeftIps;
/**
 * Position of the right cable in inches. This value holds the cable distance from the last
 * time it was re-zero'd. This value can go negative or positive. Re-zero'ing events
 * occur if the motor position goes negative, the column cart pin is pulled, or after a
 * minute of inactivity.
 */
private float positionCableRightIn;
/**
 * Speed of the right cable in IPS. */
private float speedCableRightIps;
}
```

Certain of these data items are sent or received by exercise machine (210), to or from server (200), via the websocket discussed above. In particular, data item "motorTensionLbs" indicates the tension that the user is generating by pulling on a cable of exercise machine (210). Moreover, data item "total WeightAppliedLbs" is the total load or resistance that the motor of exercise machine (210) is instructed to generate on that cable.

In the tug-of-war example above, each of the first and second exercise machines (210) send server (200) data packets comprising a report of, among other things, motorTensionLbs, to indicate how much pulling force is being generated by the first and second user, respectively. In response, server (200) sends both exercise machines (210) data packets comprising an update of, among other things, totalWeightAppliedLbs, to indicate to each exercise machine how it should adjust the load or resistance of its motor, as discussed above.

Note that motion tension, motorTensionLbs, and total load or resistance, total WeightAppliedLbs, are just two possible types of data that server (200) might coordinate during collaborative workouts among users. Other data types subject to coordination among collaborating users include, for example, timing—for example the moment when one or more users is to begin a rep or exercise, number of reps—for example the number of reps suggested to a user for an exercise, velocity of reps, and sensor data from peripheral devices that coordinate biological factors to determine load or weight applied.

A collaborative exercise machine may be set to a single user experience mode. In that scenario, the user sets the load or resistance for an exercise by, for example, interacting with the screen of the exercise machine. Within the collaborative user exercise experience, it is server (200) that may set the load or resistance for each user's exercise machine, based on the tension being generated by each user at their respective exercise machine.

Figure 6:
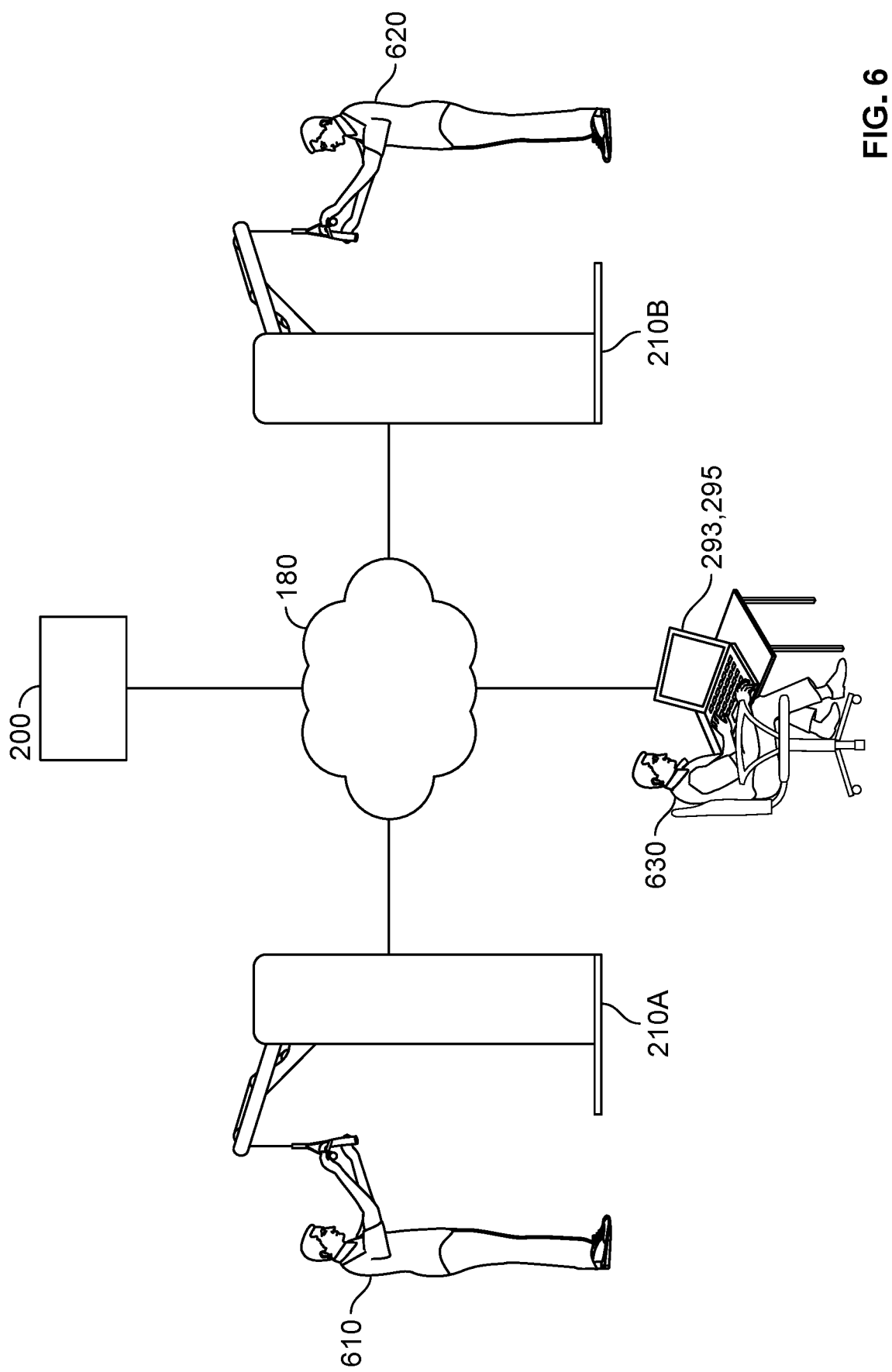
FIG. 6 is an illustration of an embodiment of two users engaging in collaborative exercise.

FIG. 6 is an illustration of an embodiment of two users engaging in collaborative exercise. First user (610) and second user (620) operate two exercise machines (210A) and (210B), respectively, that are coupled to an intermediating server (200) via network (180) and the rope tension that would be experienced in the above tug-of-war example may be communicated to each machine.

Initially, in a contest where the competitors, or opponents are connected by a rope, the first step is to load the rope so that the marker is centered at a fixed line. This means that each opponent pulls until the rope is taut. In the machine example, as first user (610) pulls on the user grip point, the pulling force exerted matches that applied by the opponent (620), so that if one opponent is slow to apply a load then the other may feel only a small opposition to a pull. This effect may be achieved by communicating the loading tension of one machine to the other where it may be replicated.

The implicit latency that appears due to the transit time of information is small for practical purposes but in this example may be compensated by factoring it into an algorithm that simulates elasticity in a rope; that is to say that as a user tugs on one end of a physical rope, some stretching is normal and this may be expressed by a machine as a constant tension on the coupling mechanism which allows for some movement prior to the tension increasing responsive to the opposing effort contributed by the other user. In mathematical models, this effect may be characterized as a non-linear spring. As far as a coupling cable at the exercise machine is concerned, within the realm of human strength the cable is inelastic and suffers only an imperceptibly small dimensional change so the effect of a rope may be controlled by changing the excitation current at the motor system. Both displacement and load may be measured and these factors sent to the server.

In the case that opponents (610) and (620) are well matched in terms of strength, based on information gathered during prior exercise periods, the communicated data may be unchanged except for the necessary augmentation to provide for timing and "feel." By contrast, if opponents (610) and (620) are unmatched, a proportioning algorithm may be used to scale the data so that each opponent experiences a matched competitor at their nominal "strength rating;" this means that a less powerful user may meaningfully compete against a stronger competitor and yet still be able to develop skills of timing. Although this handicapping availability is intended for matching opponents of different performance capacity, in one embodiment a solo competitor may compete against a reflection of their own efforts handicapped to allow for tiredness effects and timing offsets.

The intermediating server (200) performs an algorithmic determination of forces to be applied in response to force information received from one or more users and communicates the information that defines the exercise machine condition to the appropriate machine and user. Analysis of the data received at the server (200) also allows for the position of the marker flag to be determined, as a net movement of that part of the rope, and, in one embodiment, to be displayed to the participants as a visual display, bringing a strong motivation to the competition.

If the exercise machines have cameras enabled, then each participant (610) and (620) may see the other depicted on the display screen at the opposite end of the virtual rope; this allows physical cues or tells to be perceived that adds to the realism of the simulation. A winner may be determined by the server once the marker flag that represents a predetermined point on the virtual rope has moved a prescribed distance. This may be displayed to the participants as a pair of lines equidistant from the starting point so that they maintain an awareness of their progress in the competition.

In one embodiment, the competition between participants (610) and (620) is directed by a virtual coach manifested on the exercise machines (210A) and (210B) of the participants. In one embodiment, the coach is a live person (630) who communicates, via server (200), with participants (610) and (620) using a mobile app (293) or website (295), connected by network (180). As discussed above, this live coach (630) can instruct and advise participants (610) and (620) before, during, and after the competition.

Tug-of-War Details.

Returning to the tug-of-war example, while this exercise may appear to be a simple strength contest, the fidelity of digital weights permits deeper tactical behavior. Well matched opponents (610, 620) are able to hold a remarkable amount of tension in the connecting rope, but careful timing of load transients may be used to unbalance an opponent. Skill at choosing the scheduling of load application may also be important to winning.

From the data gathered during a contest using the exercise machines (210), information about strength can be determined from the load recorded coupled with the movement information as work performed. Skill may be inferred from the load transients and the timing of these coupled with movement information. In this way a user record may be compiled for this category of contest and scores applied that allow quick and/or accurate comparison of competitors and their relatively simple handicapping.

There are several scoring systems that may be applied to generate a robust user data set and one embodiment uses the "Elo" rating system; originally formulated for assessing the skills of chess players, this rating method finds considerable application in a wide range of competitive activities where some strategic thinking, or skill, is required.

A user's ranking in a league table (460) of competitors is updated for each competition and these updates are calculated with consideration given to the starting rank of an opponent and whether a win or a loss was recorded. At the conclusion of a contest, defined as that moment when a flag crosses the threshold of one or other of the participants, the load applied to each exercise machine is smoothly reduced to zero and once the grip is determined to have been released, the exercise machine then gently retrieves the grip to its resting position.

The current status of a game in play may be signaled using the display (140) for each exercise machine (210). In one embodiment, the screen background changes color to indicate that a competitor is ahead or behind in a game. A server (200) connection may also be made available for non-participants to watch the game and status is reflected on these audience devices (293, 295). Further, user ranking may be provided so that a real time assessment of performance is viewable by prospective contenders; the ability to observe strategic elements in a player's style may lead to better quality competition.

In a public environment, connections between exercise machines (210) and servers (200) is generally achieved using a typical commercial Internet connection. Exercise machines (210) that are housed in a campus environment may be interconnected with servers (200) and other elements directly and be entirely private from other networks. The connection protocols used may be determined by the application and need not be dependent on any particular standard, save that the connection rate be fast enough to avoid any undue latency in message transfer. This exemplar competitive scenario described is one of the simpler applications having a minimum system comprised of two exercise machines (210) as described, coupled to a server function. In one embodiment, this server (200) functionality resides in a master exercise machine (210) so that a separate physical server presence is not required.

Similar to the one-on-one tug-of-war described, a team event of tug-of-war may be performed on collaborate exercise machines (210). With a number of participants on each side, the same operating protocols may be followed as described in FIGS. 4A/4B. However, below are some differences. The load on the rope is the sum of all forces in one direction plus the sum of all forces in the opposite direction. The problem is essentially linear because a rope can only assume a straight line between teams and out-of-line forces are simply wasted effort since in a standard physical contest any offset would either have to be countered by team members or result in swiveling the action of the rope. Each team member is subjected to the tension (load) in the rope ahead of them less the effort available from the sum of the tension forces behind them. This is a straightforward calculation for the strength component of the applied effort.

What advantage that accrues from creating a pulsating transient depends very much upon the synchronous application of transient effort from all the team. The nature of the contest requires the leader of the team to develop and maintain a rhythm that can be fostered by all participants on the team, with the goal being to disturb the balance of at least one member of the opposing team; once one team member fails to be able to apply a required component of the total tension, then there may be quick movement of the marker flag that defines the winning team as it crosses a predefined threshold.

In one embodiment, the server (200) may provide a program that allows the exercise machines (210) of a team or group of contenders to simulate a competitive opponent so that practice sessions are easily achievable. The simulation may include algorithms that are adaptive and able to capitalize on the falling edge tension loss after an applied transient by the practicing team so that they are able to maintain a base load that reduces their exposure to loss. In another embodiment, one of the exercise machines in use contains a server that is able to access team information that is stored on an external database and is usable in conjunction with a stored program that may be downloaded from a controlling server.

Rowing.

A further application of the technology that supports collaborative training of a team is a system that may be used to practice rowing. Pairs, Fours and Eights are common team arrangements in the rowing sports and, as in the tug-of-war example, are highly sensitive to synchronism between crew members. In this case, instead of being tasked against the efforts of an opponent the enemy is identified as the environmental factors due to wind, waves and currents. Many boat race courses are well known and predefined so information is gathered for a range of conditions over the course using a vessel that is equipped with sensors to record the dynamics of the river. For example GPS receivers may determine the current flow, anemometers may be used to measure wind action and accelerometers may be used to determine the effects of wave action. These factors may be stored in a database and would allow composite models to be built for any particular course with the effects of specified wind, wave and current developed using interpolative techniques to resolve effects as the simulated vessel negotiates the course.

Crew are normally required to be able to alter the relative efforts applied to right and left oars to achieve lateral movement components to steer the boats and this modeling is able to provide the needed stimuli for effective practice. The effects of rowing in the wind shadow of opponents may also be modeled in this way. In one embodiment, the user (610) occupies a seating position where the oars are simulated by an arrangement of levers to allow for effort to be expended in both directions, fore and aft, whilst the seat is able to roll freely or else generate resistance differentially in fore and aft movement, to simulate the momentum change as the oarsman exercises against the boat.

It should be noted that these collaborative exercises span from small, one-on-one interactions to large-scale multiuser scenarios, as described in the following table of collaboration modalities and/or scenarios enabled by the collaborative exercise machine:

TABLE 1

Collaborative Exercise Machine Modalities.

| Group | Teaching and Learning | Cooperation | Competition | Parallel Play |
|---|---|---|---|---|
| 1:0 (virtual) | Learn from a virtual coach | Cooperate with virtual user | Compete against virtual user | Play beside a virtual user |
| 1:1 (direct play with another) | Learn from a coach | Cooperate with another user on a task | Compete against another user on a task | Play beside another user |
| 1:many (direct play with many others) | Group class with one coach | Cooperate with many other users to accomplish a task | Compete against many other users to accomplish a task | Play beside many other users |
| Many:many (team play) | Group coaching | Cooperate with a team to compete against other teams to accomplish a goal | | Cooperate with a team side by side together with other teams (e.g. simulation games) |

In Table 1, the Teaching and Learning column references explicit modalities designed for experiential learning or direct instruction. For example, a user can learn from a virtual coach whose actions are designed to optimize just-in-time load demands or rep counts so that the user explicitly and/or implicitly learns to perform movements with optional motion. Similarly, a user can learn from a live coach, or in group classes with others led by a live coach, whereby the coach's actions directly impact the felt experiences of the users, for example feeling the coach's actions on the user's (610) actuator (110) of their exercise machine (210). One embodiment of this learning involves moving slowly, dynamically with perfect form, for example during rowing or while performing a large number of repetitions.

In one embodiment, a live or virtual coach instructs the user exercise machines to apply force on their cables in a slow regular rhythm. Users join in with a goal to maintain this pace. If a user starts to move too quickly, the load is made more heavy within the rep to throttle the user's speed, helping the user to perfectly coordinate with the coach's pace, so that the user can feel the timing. If a user is moving too slowly, their load is lightened such that they are able to catch up to the coach's pace. In one embodiment, the live and/or virtual coach steps in and applies force to the user's cable. Visual representations indicate where the user is in pace in relation to the instructor, or in a group context, in relation to others in a group.

In Table 1, the Cooperation column concerns a user exercising together with one or more real or virtual other users to collectively accomplish a goal or coordinate an action. In this scenario, data from the multiple user exercise machines is combined by server (200) to assess progress against the goal or action.

In Table 1, the Competition column concerns a user or team of users competing against another user or team of users. In this scenario, there is a "winner" and one or more "losers". A paradigm competitive scenario involves gaming.

For example, joint collaborative exercise activities, such as jointly lifting or balancing loads, "gamify" an exercise paradigm, while adding fitness actions to typical gaming activities "fitnesses" a game experience. The prior discussion on team rowing is an example of a gamified experience. The primary felt activity is exercise, with "gamified" competitive aspects integrated into the experience. Games may be also be cooperative, not just competitive.

In Table 1, the Parallel Play column concerns scenarios in which multiple users exercise together, but neither cooperate nor compete, as defined above. In these exercises, key aspects involve synchronizing the activities of the collaborating users, sharing audio and video, and statistical data among the user exercise machines so that the users feel they are exercising as a collective group. In one embodiment, this parallel play includes shared environment that changes according to the individual actions of the participating users. Users adapt the environment together, while experiencing that environment, with their cumulative action changing the sensory, for example visual, auditory, haptic, and load, context that they share while exercising, offering an experience that is the result of cumulative action.

Although tug-of-war and rowing have been discussed in detail herein without limitation, the collaborative exercise machine is capable of generating and operating almost any kind of collaborative exercise. Examples of such exercises follow below.

"Heart to Heart".

In one cooperative embodiment, users (610) may have "heart to heart" coordination on a cardio activity. For example, the exercise machine is capable of setting a heart rate goal; either specific, such as (155) beats per minute, or as a percentage of a user's known max heart rate. As a user rows or conducts any other cardio activity, their heart rate follows normal patterns of ups and downs based on effort. The exercise machine uses this information to provide the "right" amount of effort to maintain the user's heart rate within the target zone at a given pace.

In a coordinated heart to heart activity, a user (610) decides to coordinate his or her heart rate to that of one or more other users (620), rather than to a singular specified zone. In this case, a heart rate monitor streams periodic average heart rate data to the server, allowing one user to "pace" another user's target heart zone for a given period in a workout. The paired user or users receives a force algorithm designed to put their heart in the same "zone" as the other for a given pace.

"See Saw".

This exercise mimics a typical children's playground activity known as a "see saw." In this cooperative embodiment, a user (610) selects the activity and sees a perspective of someone (620) on a "see saw" on the tablet. As one user (610) performs a push movement such as a squat, they see the perspective of themselves rising up, and their other coordinating user (620) lowering down. Their movements are then ineffective onscreen until the other player squats, pushing themselves up and lowering the first user down. The first user's actions now impact the screen (140). Users can converse over audio and "hang out" together while performing casual low grade movements that are not explicitly goal driven as much as experience driven.

"Amazing Race".

Collaborative exercises can range from two users to hundreds to thousands and perhaps even millions of users. In one cooperative and competitive embodiment, users are challenged to complete an "amazing race" by climbing, rowing or biking across a specified terrain over the course of a month at a specified time each day. Each day, teams are presented with that day's "terrain"—their goal is to get through the daily challenge together. One day they may be "climbing" by doing overhead presses to reach the top of a canyon. Another day they may be "rowing" to move their team across treacherous rapids. Each is carrying "supplies" that need to be moved across the terrain using force.

If a teammate does not show up or does not participate strongly enough to move their share of the load, the other teammates in real time find themselves burdened with the extra weight. If a teammate fails to complete "work" to move their load over a given distance by a large enough percentage, teammates are no longer able to bear the brunt for them—they "fall" and are removed from the race. Teams can go from having thousands of members to very few by the end of a difficult challenge.

"Car Racing".

In one competitive embodiment, two users (610, 620) playing a version of a popular car racing game would "power" their own speed as well as the obstacles they can throw to slow down others by accumulating "power" by exercising on the exercise machine. In one embodiment, users generate power by pulling on the cables for a specified duration until their cars take off. As they race, their cars speed and power is directly related to the power they are generating by pulling on the cables. A user is rewarded for factors such as steady consistent pace, and form or range of motion, with points that accumulate to release obstacles for their opponent at specific times.

In one embodiment, two minutes into the race, if one party has hit targets for range of motion and cadence, an obstacle such as a banana peel is achieved and stored, represented visually onscreen. The user (610) who has achieved this item can release it under the opponent's (620) car. The target user receiving the "banana peel" feels this as an increased isometric load algorithm for a specified period of time that lessens their speed of pull for a duration of time, slowing their "car" on the track and requiring them to pull harder to stay in the race.

"Meditation".

In one cooperative and parallel play embodiment, two or more users are engaged in activities that bring them a shared sense of wellbeing. A video shown on the tablet guides players in a mediation activity that is punctuated by periods of intense physical effort. In one embodiment, a player is seated on a bench with a bar actuator resting in their lap. They are engaged in guided meditation led by a video showing a soothing scene, for example a forest scene, with an audio track. When it is time to break mediation and enter action, users are invited to "make it rain" together. A video of forest leaves in the rain is playing in the background. Performing an overhead press, users "push" up to the sky repeatedly, their accumulated "power" drives the video playback speed on screen. The more the users push, the faster the rain falls. It starts to rain faster, harder, until a specified duration or accumulated force is reached, eventually thunder rolls in and people are guided back into meditation.

"Building Together".

In a cooperative embodiment, users are "building" a world together as they go through a structured exercise program. Simulations on screen represent the amount of "work" done of various movements. Each player is responsible for a "skill" that is needed for a critical feature needed for survival. For example, in this embodiment, users "chop" to fell trees and "lift" reps in an overhead press to build a roof, while they "push" laterally to shove stones into a wall.

Users who play together "level up" when enough work is accomplished to build a house; their program advances to the next level. They are given more complex moves that result in more complex simulated structures based on more complex movements. Surprising elements enter the game context, such as threatening creatures that may be "slayed" without notice, keeping the program fresh and dynamic. In one embodiment, designed to harness interpersonal pressure to participate, players cannot level up beyond a certain point one without the participation of another. For example, if two players are "building" a house, each player needs to contribute chopping and lifting to build the walls. The house cannot be finished unless each player does their part.

"Climb a Wall".

Users race to the top of a wall by performing alternating lat pull downs. The exercise machine (210) sets the weight or load for each user based on the user's ability and body weight. As a user (610) pulls on the cable, the exercise machine detects the users range of motion, for example via cable length, and "moves" their digital avatar up the wall, for example displayed on the screen, along with other, competitive user avatars. The first user to pull themselves to the top of the wall wins!

"Fill a Bucket".

Users work together to fill a large bucket with rocks of various sizes and weights. A rock is shown on the screen and sets the load or weight corresponding to the rock size, and the user may lift the rock up, for example performing a deadlift, in order to for the exercise machine to place the rock in the bucket. Together, two or multiple users can fill a bucket for time or in competition with another group and/or amongst themselves.

"Hang for Time".

Users hold good range of motion/form for a position or movement with load or weight decided by the exercise machine for as long as they can. As they struggle, the exercise machine shows their range of motion and/or the range of motion of the other users on the screen to see how close they've come to losing form. The first to let their range of motion, for example measured by cable length, fall out of the boundaries loses the round.

"Bucket Hold".

This is similar to "hang for time," but every 5 seconds, the system adds weight, for example half a pound. The first user who fails to maintain proper range of motion or proper form loses the round.

"One Up! (H-O-R-S-E)"

That is, "you do 10 repetitions, I do 11, you do 12, who goes the highest?". For a given movement, for example, a bicep curl, the exercise machine may suggest a load or weight based on a user's ability. The first user (610) performs a rep with quality form, measured by a combination of speed, range of motion, and gyroscope data from smart handles. The second user (620) performs the same movement for one extra rep. Subsequent users, going in a circle back to the original user (610) and on, keep adding an extra rep, until one of the users "loses" by stopping the movement or failing to perform a quality rep.

"Bicycle Racing".

In one embodiment, the cables of the exercise machine are attached to the pedals of a stationary bicycle. The user (610) sets the bicycle to operate at minimal resistance. Resistance or load would be generated by the exercise machine and/or its cables. With this dynamic, the stationary bicycle comes alive, with all of the features of collaborative workouts discussed herein. For example, a group of stationary riders connected to their respective exercise machines may form a "biking team", with one rider in the lead, and others drafting behind the lead. Server (200) might set the load or resistance for the lead to be greater than that for the riders "draughting behind".

"Relay Race".

A first user performs as many reps as possible until exhausted, then 'passes the baton' onto a second user to continue performing reps for their team; success requires maintaining a minimum pace of performing reps across players and not 'dropping the baton'.

"Build a Pyramid".

Imagine ancient Egyptians having to lift big heavy stones; all players have to lift simultaneously, that is perform each rep simultaneously, in order to successfully raise the stones into position. If anyone falls behind or gets ahead, the stone falls.

"Volley".

A first user performs one rep then a second user performs one, switching back and forth. Each user has to keep up with the other, the rep of one user starting the moment the other user completes.

The foregoing collaborative exercise scenarios are examples without limitation. Server (200) enables any type of collaborative exercise, including cooperative, competitive, and parallel, and any combination thereof. Further, this collaboration involves server (200) sharing any kind of data generated or used by the exercise machines, including, for example, tension or load, timing of reps or sets, and number of reps, as well as video and audio, and statistical data. Further, server (200) enables any combination of this shared data, including, for example, adding, subtracting, collating, sequencing, handicapping, and so on.

Collaborative exercises give the collaborating users the feeling of a shared exercise experience which, in turn, provides motivation to the users to participate. These collaborative exercises also enable coaches and trainers to participate in and lead the group workouts which gives the users the benefit of live coaching, and the coaches, access to a client audience far larger than a coach's local geographic area.

As well, an entire new area for gaming is enabled—adding exercise to already popular games that currently require only thumb movement. When users are playing the games as described above, they are performing large, body based movements that improve them by improving their fitness while playing. In one embodiment, handles with three access accelerometers and buttons enhance the exercise machine, helping users to navigate when necessary, and to "fire" powers that they have achieved with strategic timing that directly and immediately impacts the experiences of other players.

As shown in FIG. 1 and FIG. 6, a local exercise device (210A) comprises an electromagnetic resistance unit (110) and a control interface (170) configured to: send a report of a state of the local exercise device based at least in part on a user (610) response to the electromagnetic resistance unit (110); receive an update based on a state of a remote exercise device (210B); and a controller (102) that causes the electromagnetic resistance unit (110) to change state in reaction to the received update.

In one embodiment, the electromagnetic resistance unit is a motor. In one embodiment, the report is sent to a remote device and the update is received from the remote device. The remote device may be a peer device and/or a remote server. In one embodiment, the remote device sends the update to increase force associated with the electromagnetic resistance unit on the local exercise device and a remote electromagnetic resistance unit on the remote exercise device until it is determined that the state of at least one of the exercise devices reflects that an associated user is beginning to be overcome by the force, for example in the tug-of-war application described above.

In one embodiment, the report and the update cause the local exercise device and the remote exercise device to perform substantially isokinetically and/or synchronously as described above. For example, the local exercise device and the remote exercise device simulate a tug of war game.

In one embodiment, the report and the update cause a user of the local exercise device and a remote user of the remote exercise device to cooperatively apply a force to simulate lifting a heavy object. In one embodiment, the report and the update cause a user of the local exercise device and a remote user of the remote exercise device to cooperatively apply a force to simulate rowing a boat together. In one embodiment, the report and the update cause a user of the local exercise device and a remote user of the remote exercise device to cooperatively apply a force to collaborate to achieve a goal.

In one embodiment, the report and/or the update comprises a performance metric. One example of the performance metric comprises a measurement of at least one of the following: position, speed, acceleration, time, pressure, momentum, work, energy, weight, and power. Another example of the performance metric comprises a measurement of at least one of the following: heart rate, oxygen perfusion, respiration rate, SpO2, calorie consumption, body temperature, brain activity, muscle motion, and sweat rate. In one embodiment, the report comprises input/output of at least one of the following types: audio, video, speech, and haptic.

Similarly, a remote exercise device (210B) comprises: an electromagnetic resistance unit (110); a control interface (170) configured to: send a report of a state of the remote exercise device (210B) based at least in part on a user (620) response to the electromagnetic resistance unit; receive an update based on a state of a local exercise device (210A); and a controller (102) that causes the electromagnetic resistance unit (110) to change state in reaction to the received update.

Figure 7:
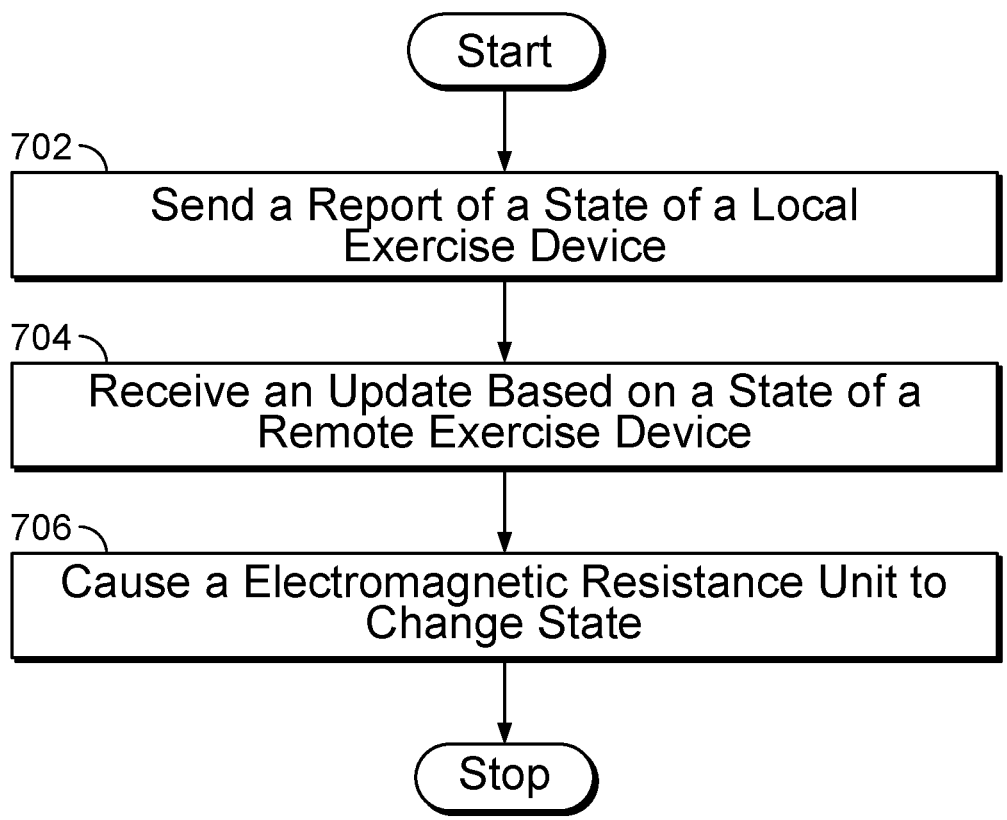
FIG. 7 is a flow chart illustrating an embodiment of a process for collaborative exercise.

FIG. 7 is a flow chart illustrating an embodiment of a process for collaborative exercise. In one embodiment, the process of FIG. 7 is carried out by the controller (102) of FIG. 1. In step (702), a report of a state of a local exercise device (210A) based at least in part on a user (610) response to an electromagnetic resistance unit (110) in the local exercise device is sent. In step (704), an update based on a state of a remote exercise device (210B) is received. In step (706), the electromagnetic resistance unit (110) is caused to change state in reaction to the received update.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A local exercise device comprising:
   one or more load sensors;
   an electromagnetic resistance unit;
   a control interface configured to:
      send a report of a state of the local exercise device based at least in part on an output from the one or more load sensors;
      receive an update based on a state of a remote exercise device, wherein the state of the remote exercise device includes load data; and
   a controller that causes the electromagnetic resistance unit to change state in reaction to the received update based at least in part on a proportioning algorithm that scales the load data included in the received update to match a first user associated with the local exercise device and a second user associated with the remote exercise device at a nominal strength rating.

2. The local exercise device of claim 1, wherein the electromagnetic resistance unit is a motor.

3. The local exercise device of claim 1, wherein the report is sent to a remote device and the update is received from the remote device.

4. The local exercise device of claim 3, wherein the remote device is a peer device.

5. The local exercise device of claim 3, wherein the remote device is a remote server.

6. The local exercise device of claim 1, wherein the report includes load and movement measurements associated with the local exercise device.

7. The local exercise device of claim 3, wherein the remote device sends the update to increase force associated with the electromagnetic resistance unit on the local exercise device and a remote electromagnetic resistance unit on the remote exercise device until it is determined that the state of at least one of the exercise devices reflects that an associated user is beginning to be overcome by the force.

8. The local exercise device of claim 3, wherein the report and the update cause the local exercise device and the remote exercise device to perform substantially isokinetically.

9. The local exercise device of claim 3, wherein the local exercise device and the remote exercise device simulate a tug of war game.

10. The local exercise device of claim 3, wherein the report and the update cause the first user of the local exercise device and the second user of the remote exercise device to cooperatively apply a force to simulate lifting a heavy object.

11. The local exercise device of claim 3, wherein the report and the update cause the first user of the local exercise device and the second user of the remote exercise device to cooperatively apply a force to simulate rowing a boat together.

12. The local exercise device of claim 3, wherein the report and the update cause the first user of the local exercise device and the second user of the remote exercise device to cooperatively apply a force to collaborate to achieve a goal.

13. The local exercise device of claim 1, wherein the report comprises a performance metric.

14. The local exercise device of claim 13, wherein the performance metric comprises a measurement of at least one of the following: position, speed, acceleration, time, pressure, momentum, work, energy, weight, and power.

15. The local exercise device of claim 13, wherein the performance metric comprises a measurement of at least one of the following: heart rate, oxygen perfusion, respiration rate, SpO2, calorie consumption, body temperature, brain activity, muscle motion, and sweat rate.

16. The local exercise device of claim 13, wherein the report comprises input/output of at least one of the following types: audio, video, speech, and haptic.

17. The local exercise device of claim 1, wherein the update comprises a performance metric.

18. A method, comprising:
sending a report of a state of a local exercise device based at least in part on an output from one or more load sensors;
receiving an update based on a state of a remote exercise device, wherein the state of the remote exercise device includes load data; and
causing an electromagnetic resistance unit to change state in reaction to the received update based at least in part on a proportioning algorithm that scales the load data included in the received update to match a first user associated with the local exercise device and a second user associated with the remote exercise device at a nominal strength rating.

19. The method of claim 18, wherein the report is sent to a remote device and the update is received from the remote device.

20. A computer program product embodied in a non-transitory computer readable medium and comprising computer instructions for:
sending a report of a state of a local exercise device based at least in part on an output from one or more load sensors;
receiving an update based on a state of a remote exercise device, wherein the state of the remote exercise device includes load data; and
causing an electromagnetic resistance unit to change state in reaction to the received update based at least in part on a proportioning algorithm that scales the load data included in the received update to match a first user associated with the local exercise device and a second user associated with the remote exercise device at a nominal strength rating.

* * * * *